(12) United States Patent
Chung et al.

(10) Patent No.: US 12,311,509 B2
(45) Date of Patent: May 27, 2025

(54) STRUCTURE FOR REPLACING SHEAR WRENCH HEAD

(71) Applicant: TECHWAY INDUSTRIAL CO., LTD., Taichung (TW)

(72) Inventors: Fu-Hsiang Chung, Taichung (TW); Cheng Nan Lien, Taichung (TW)

(73) Assignee: TECHWAY INDUSTRIAL CO., LTD., Taichung (TW)

( * ) Notice: Subject to any disclaimer, the term of this patent is extended or adjusted under 35 U.S.C. 154(b) by 631 days.

(21) Appl. No.: 17/570,070

(22) Filed: Jan. 6, 2022

(65) Prior Publication Data

US 2023/0211480 A1 Jul. 6, 2023

(51) Int. Cl.
*B25B 23/00* (2006.01)
*B25B 21/00* (2006.01)
*B23B 31/02* (2006.01)

(52) U.S. Cl.
CPC ........ *B25B 23/0035* (2013.01); *B25B 21/002* (2013.01); *B23B 31/02* (2013.01)

(58) Field of Classification Search
CPC ... B25B 23/0035; B25B 21/002; B25B 13/44; B25B 13/48; B25B 13/488; B25B 19/00; B25B 21/00; B25B 21/007; B25B 21/02; B25B 23/0007; B25B 23/02; B25B 23/14; B25B 23/1415; B25B 23/147; B25B 28/00; B25B 33/00; B25F 5/02; B23D 29/02; B25D 17/084; F16B 35/045; B23B 31/02; B23B 31/028; B23B 31/12; B23B 31/123; B23B 31/16041
See application file for complete search history.

(56) References Cited

U.S. PATENT DOCUMENTS

| | | | | |
|---|---|---|---|---|
| 5,197,749 | A * | 3/1993 | Moore | B25B 33/005 279/147 |
| 5,893,851 | A * | 4/1999 | Umber | A61B 17/162 279/75 |
| 2006/0027978 | A1 * | 2/2006 | Young | B23B 31/1238 279/62 |
| 2017/0043457 | A1 * | 2/2017 | Tsuge | B25F 5/00 |
| 2020/0016729 | A1 * | 1/2020 | Zimmermann | B25B 21/007 |
| 2021/0170553 | A1 * | 6/2021 | Libera | B25B 13/488 |

* cited by examiner

*Primary Examiner* — Robert J Scruggs
(74) *Attorney, Agent, or Firm* — Guice Patents PLLC

(57) ABSTRACT

A structure for replacing shear wrench head comprises a body having an inner sleeve portion, a ring groove disposed around the inner sleeve portion and a first assembly portion disposed on the inner sleeve portion; a chuck unit having a second assembly portion assembled with the first assembly portion; a central sleeve portion having at least one through hole with a locking member provided therein, a stop portion protruding inwardly is provided on the central sleeve portion; when the stop portion wedges with the first and second assembly portions, a position of the through hole approximately overlaps with the ring groove of the inner sleeve portion, so that locking members can be disposed between the ring groove and the through hole; and an outer sleeve portion slidably disposed on the central sleeve portion, and capable of optionally restricting the locking members from moving outwardly.

9 Claims, 7 Drawing Sheets

STRUCTURE FOR REPLACING SHEAR WRENCH HEAD

BACKGROUND OF THE INVENTION

Field of Invention

The invention relates to a power tool, and more particularly to a structure for replacing shear wrench head capable of replacing a head quickly.

Related Art

When fixing a bolt, in order to remove the excess bit at the end, a shear wrench is used to tighten the nut and shear off the tail end by twisting. Because the bolt is fastened in different positions, the required strength is also different, bolts of different sizes are chosen to match different applied positions, and chucks of different sizes also need to be matched with the bolts in use. Please refer to FIG. 1, a conventional shear wrench 10 is provided, which mainly comprises a main machine portion 11, a chuck 12 and an outer sleeve portion 13. A front end of the main machine portion 11 is provided with a drive portion 111, the chuck 12 is assembled in the drive portion 111, and can be driven to rotate by the drive portion 111. The outer sleeve portion 13 is hollow and the chuck 12 can be inserted therein. In order to fix a position of the chuck 12, two screw fixing elements 131 are disposed at an end of the outer sleeve portion 13 to be screwed and fixed in the main machine portion 11. When the chuck 12 is to be replaced, a tool can be used to remove the screw fixing elements 131 on the outer sleeve portion 13 so that the outer sleeve portion 13 can be separated from the main machine portion 11 and the chuck 12 can be taken out from the main machine portion 11.

However, in the conventional shear wrench, when the outer sleeve portion 13 is to be disassembled, a tool needs to be used to loosen the screw fixing elements 131. After the chuck 12 is replaced, the screw fixing elements 131 of the outer sleeve portion 13 are screwed in again, so that the outer sleeve portion 13 can be fixed on the main machine portion 11. The replacement operation takes a lot of time, and if the tool for loosening the screw fixing elements 131 is not handy, it is relatively troublesome to replace the outer sleeve portion 131. In addition, if the screw fixing elements 131 are not screwed properly, or fall off, it is relatively easy for parts and components to fall off to cause damage during operation.

SUMMARY OF THE INVENTION

A main object of the invention is to provide a shear wrench structure capable of quickly replacing a shear wrench head.

Another object of the invention is to provide a shear wrench structure that does not require using tools when replacing a shear wrench head.

In order to achieve the above objects, the invention provides a structure for replacing shear wrench head comprising:

- a body with an inner sleeve portion provided at a front end thereof, a ring groove is disposed around an outer circumference of the inner sleeve portion and a first assembly portion is disposed at a front end face of the inner sleeve portion;
- a chuck unit having an outer chuck, a rear end face of the outer chuck is provided with a second assembly portion, the second assembly portion is assembled with the first assembly portion;
- a central sleeve portion sleeved on the inner sleeve portion, at least one through hole penetrates through a wall surface of the central sleeve portion connecting with the inner sleeve portion, a locking member is disposed in the through hole, the locking member is partially exposed from the through hole, a stop portion protruding inwardly is provided on a front end face of the central sleeve portion, the stop portion is capable of wedging with the first assembly portion and the second assembly portion, when the stop portion wedges with the first assembly portion and the second assembly portion, a position of the through hole approximately overlaps with the ring groove of the inner sleeve portion, so that the locking member can be disposed between the ring groove and the through hole; and
- an outer sleeve portion slidably disposed on an outer peripheral surface of the central sleeve portion, an inner wall surface of the outer sleeve portion is provided with an abutting portion on a front side and a wide portion on a rear side, and a diameter of the wide portion is larger than that of the abutting portion.

The invention provides the structure for replacing shear wrench head, with the chuck unit being wedged by the central sleeve portion, the chuck unit can be coupled and fixed with the inner sleeve portion of the body, and can be operated, when the chuck unit needs to be replaced, simply push the outer sleeve portion to allow the locking member in the central sleeve portion to move freely so that the chuck unit can be replaced, replacement is simple without requiring to use any tool, thereby increasing the efficiency and convenience of replacement.

BRIEF DESCRIPTION OF THE DRAWINGS

The objects, features, and achieved efficacies of the invention can be understood from the description and drawings of the following preferred embodiments, in which.

DETAILED DESCRIPTION OF THE INVENTION

Figure 1:
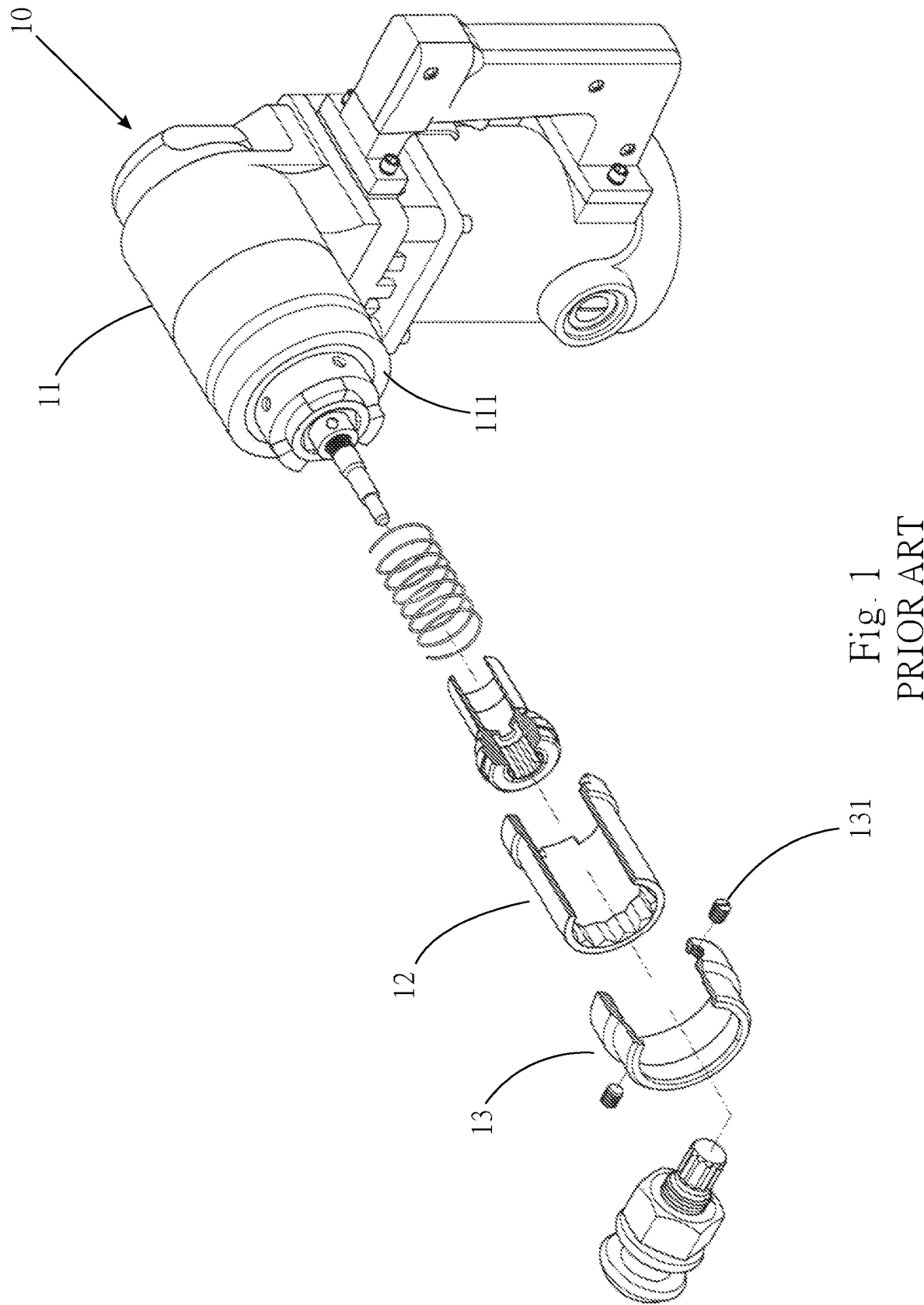
FIG. 1 is a perspective exploded view of a conventional shear wrench.
Figure 2:
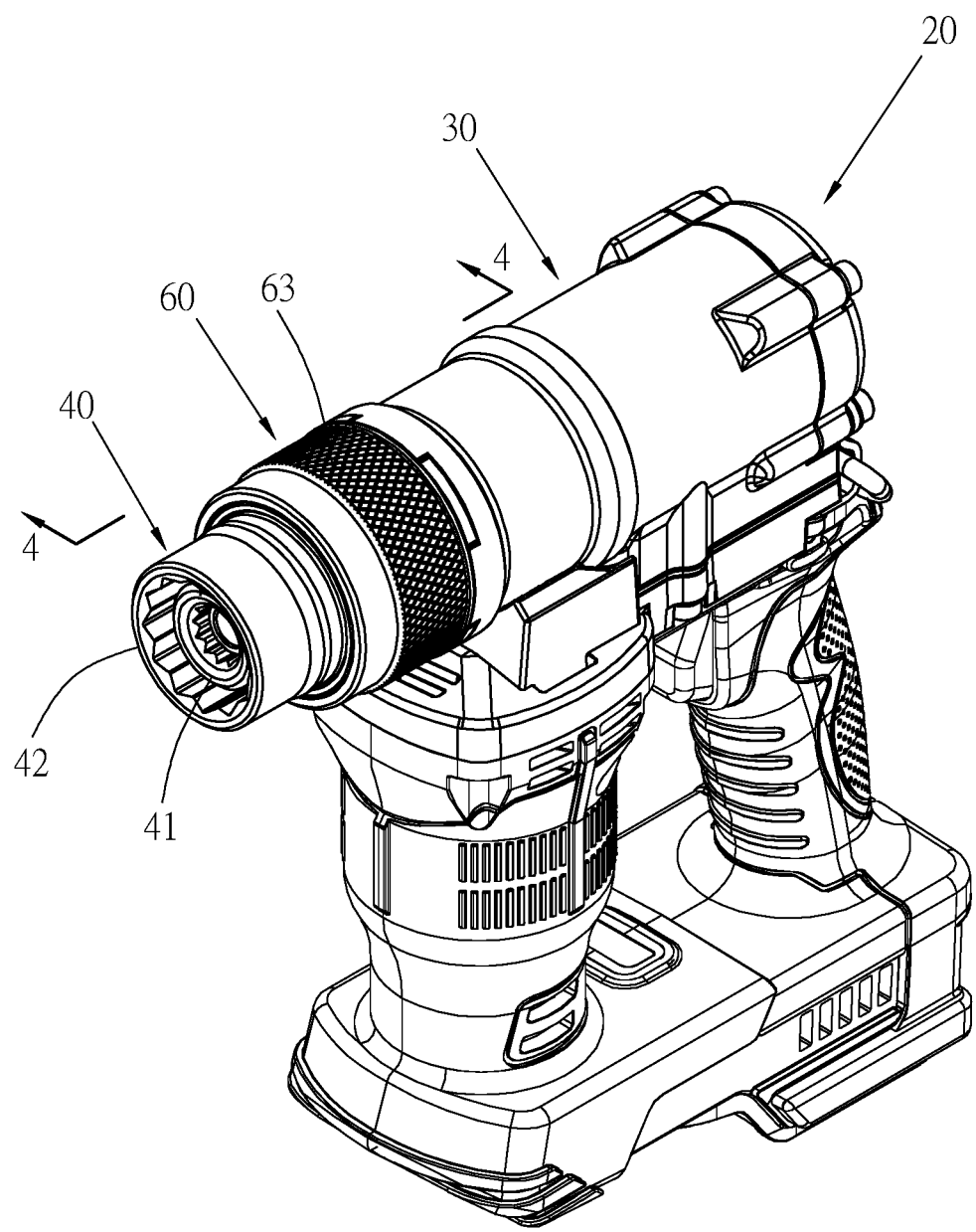
FIG. 2 is a perspective view of a preferred embodiment of the invention.
Figure 3:
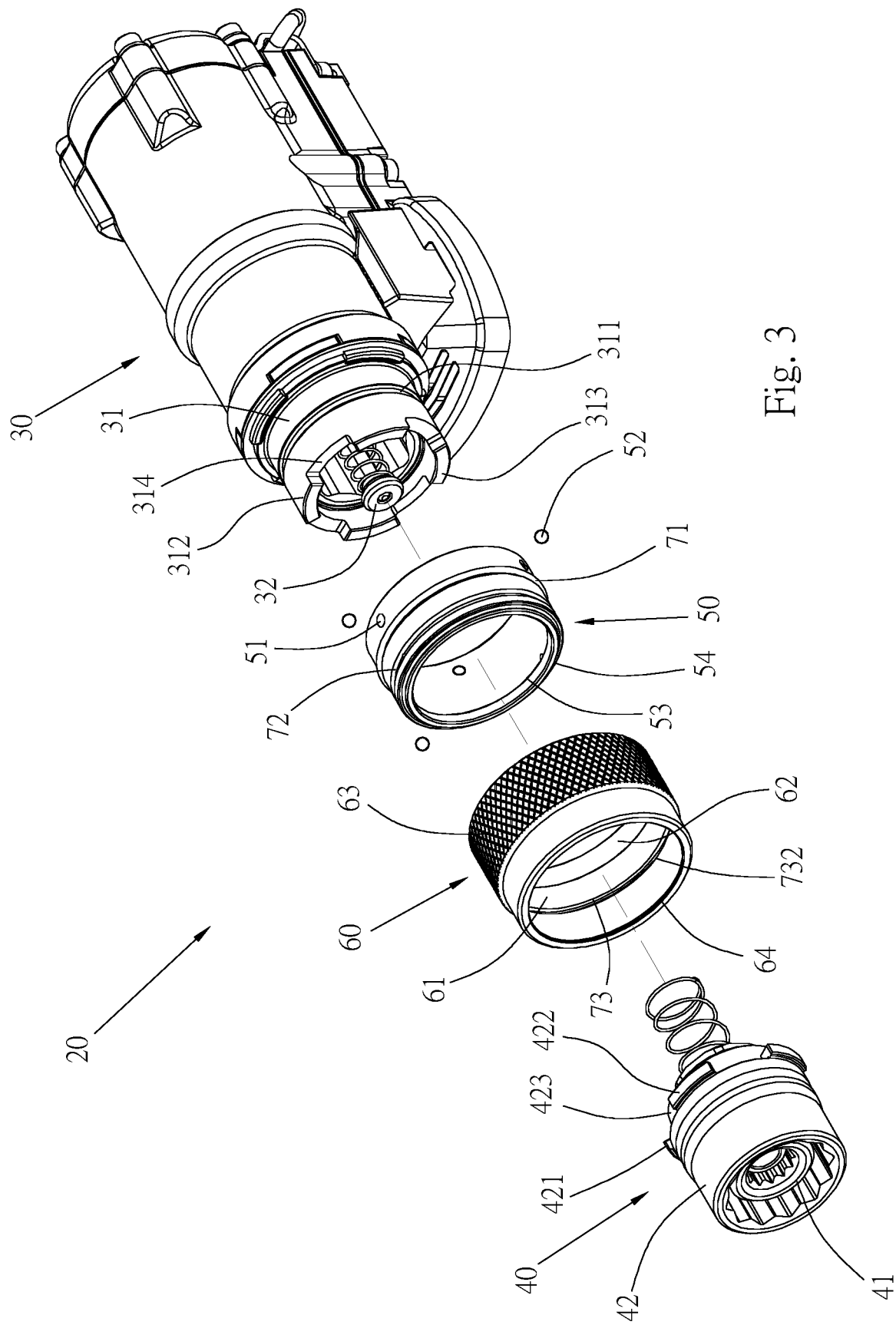
FIG. 3 is a perspective exploded view of a preferred embodiment of the invention.
Figure 4:
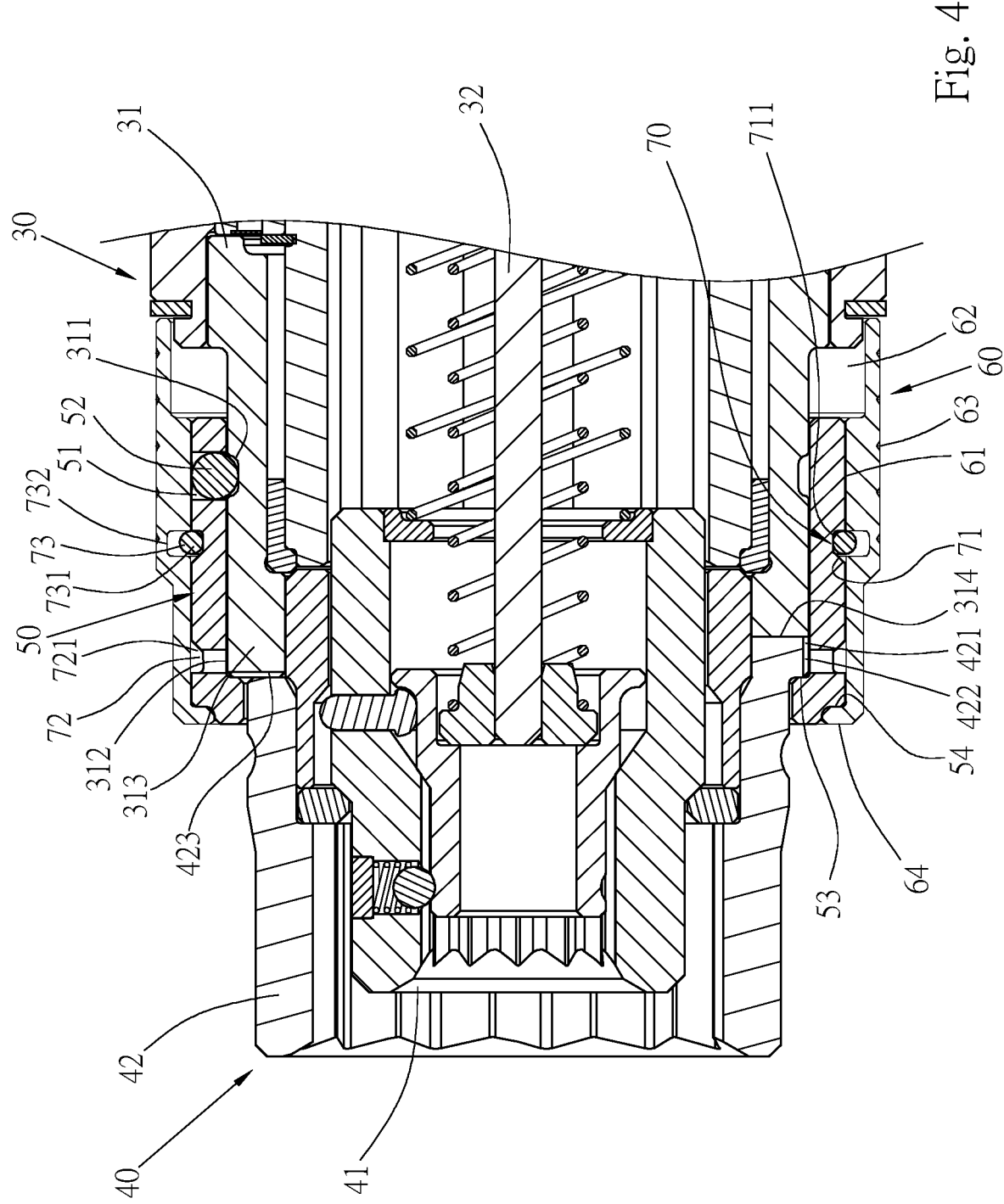
FIG. 4 is a cross-sectional view of a fixed state taken along section line 4-4 in FIG. 2.

Please refer to FIGS. 2 to 4, this preferred embodiment provides a shear wrench 20 comprising a body 30, a chuck unit 40, a central sleeve portion 50, an outer sleeve portion 60, and a positioning unit 70.

The body 30 is provided with an inner sleeve portion 31 and an exit portion 32 at a front end. The exit portion 32 is disposed inside the inner sleeve portion 31 and coaxially disposed with the inner sleeve portion 31. A ring groove 311 is disposed around an outer circumference of the inner sleeve portion 31 and a first assembly portion 312 is disposed at a front end face of the inner sleeve portion 31. The first assembly portion 312 is provided with four first protrusions 313 and four first grooves 314 disposed at intervals and around the front end face of the inner sleeve portion 31. The body 30 is capable of actuating the inner sleeve portion 31 and the exit portion 32 to drive respectively. This driving method is conventional and will not be repeated here.

The chuck unit 40 has an inner chuck 41 and an outer chuck 42. The inner chuck 41 is connected to the exit portion 32, and a rear end face of the outer chuck 42 is provided with a second assembly portion 421. The second assembly portion 421 is assembled with the first assembly portion 312. The second assembly portion 421 is provided with four second protrusions 422 and four second grooves 423 disposed at intervals and protruding outwardly from a rear end face of the outer chuck 42 in a radial direction, the first protrusions 313 are accommodated in the second grooves 423, and the second protrusions 422 are accommodated in the first grooves 314, so that an assembly position between the first assembly portion 312 and the second assembly portion 421 is located at the front end face of the inner sleeve portion 31 and protrudes from the outer chuck 42. The inner chuck 41 is used to clamp on a tail end of a bolt (not shown in the figures), the outer chuck 42 is used to clamp on a nut (not shown in the figures), and the body 30 drives the chuck unit 40 to perform a shear action by twisting, and this shear action by twisting is also a conventional technique and will not be repeated here.

The central sleeve portion 50 is sleeved on an outer side of the inner sleeve portion 31, three through holes 51 penetrate through a wall surface of the central sleeve portion 50, inside the through holes 51 are respectively provided with a locking member 52, and each of the locking members 52 is composed of a sphere. A diameter of each of the spheres is greater than a depth of each of the through holes 51, so that the locking members 52 are partially exposed from a top or a bottom of the through holes 51. A front end face of the central sleeve portion 50 is provided with a stop portion 53 protruding inwardly toward an axis of the central sleeve portion 50. The stop portion 53 is capable of wedging at a front end of the assembly position between the first assembly portion 312 and the second assembly portion 421, so that the assembly position between the first assembly portion 312 and the second assembly portion 421 can be fixed by the stop portion 53 of the central sleeve portion 50. When the stop portion 53 wedges with the first assembly portion 312 and the second assembly portion 421, a position of the through hole 51 approximately overlaps with the ring groove 311 of the inner sleeve portion 31, so that the locking member 52 can be located between the ring groove 311 and the through hole 51. In addition, an outer ring side of a front end of the central sleeve portion 50 is recessed with a step portion 54.

The outer sleeve portion 60 is slidably disposed on an outer peripheral surface of the central sleeve portion 50, an inner wall surface of the outer sleeve portion 60 is provided with an abutting portion 61 on a front side and a wide portion 62 on a rear side, and a diameter of the wide portion 62 is larger than that of the abutting portion 61. An outer circumferential side of the outer sleeve portion 60 is provided with a concave-convex portion 63, the concave-convex portion 63 is an embossed surface capable of increasing friction. When the abutting portion 61 of the outer sleeve portion 60 slides to reach a position of the through hole 51, the locking member 52 will be pressed into the through hole 51. When the wide portion 62 slides to reach a position of the through hole 51, the locking member 52 can be exposed from an open space between the wide portion 62 and the through hole 51. A front end face of the outer sleeve portion 60 is annularly provided with a convex rib 64 corresponding to the step portion 54 of the central sleeve portion 50.

The positioning unit 70 comprises a first positioning portion 71, a second positioning portion 72, and a guiding and positioning portion 73. The first positioning portion 71 and the second positioning portion 72 are disposed at an interval along an axial direction of the central sleeve portion 50 and are disposed on an outer surface of the central sleeve portion 50, and the first positioning portion 71 and the second positioning portion 72 are respectively a ring groove 711 and a ring groove 721. The guiding and positioning portion 73 is capable of moving with positional changes of the outer sleeve portion 60, the guiding and positioning portion 73 is an elastic fastener 731 and a ring groove 732, the ring groove 732 is disposed at a position of the abutting portion 61 for the elastic fastener 731 to accommodate therein, and the elastic fastener 731 can also be a C-shaped fastener or other structure capable of forming a positioning, but is not limited thereto. The elastic fastener 731 of the guiding and positioning portion 73 can be disposed on the first positioning portion 71 or the second positioning portion 72, so that the central sleeve portion 50 and the outer sleeve portion 60 will not be separated from each other. When the guiding and positioning portion 73 is located at the first positioning portion 71, the through holes 51 of the central sleeve portion 50 correspond to the abutting portion 61 of the outer sleeve portion 60. When the guiding and positioning portion 73 is located at the second positioning portion 72, the through holes 51 of the central sleeve portion 50 correspond to the wide portion 62 of the outer sleeve portion 60.

Please refer to FIG. 4, when the chuck unit 40 is fixed on the body 30, the elastic fastener 731 of the guiding and positioning portion 73 is located in the ring groove 711 of the first positioning portion 71, the abutting portion 61 of the outer sleeve portion 60 is located on outer sides of the through holes 51 of the central sleeve portion 50, and the abutting portion 61 presses against the locking members 52, so that the locking members 52 move toward the inner sleeve portion 31 to be located between the ring groove 311 and the through holes 51, positions of the central sleeve portion 50 and the inner sleeve portion 31 are fixed, and the stop portion 53 on a front end side of the central sleeve portion 50 wedges on outer sides of the first assembly portion 312 and the second assembly portion 421, so that the first assembly portion 312 and the second assembly portion 421 will not be separated from each other, that is, the outer chuck 42 of the chuck unit 40 can be fixed on the inner sleeve portion 31 of the body 30. In addition, the convex rib 64 of the outer sleeve portion 60 will also snap on an outer side of the step portion 54 of the central sleeve portion 50.

Figure 5:
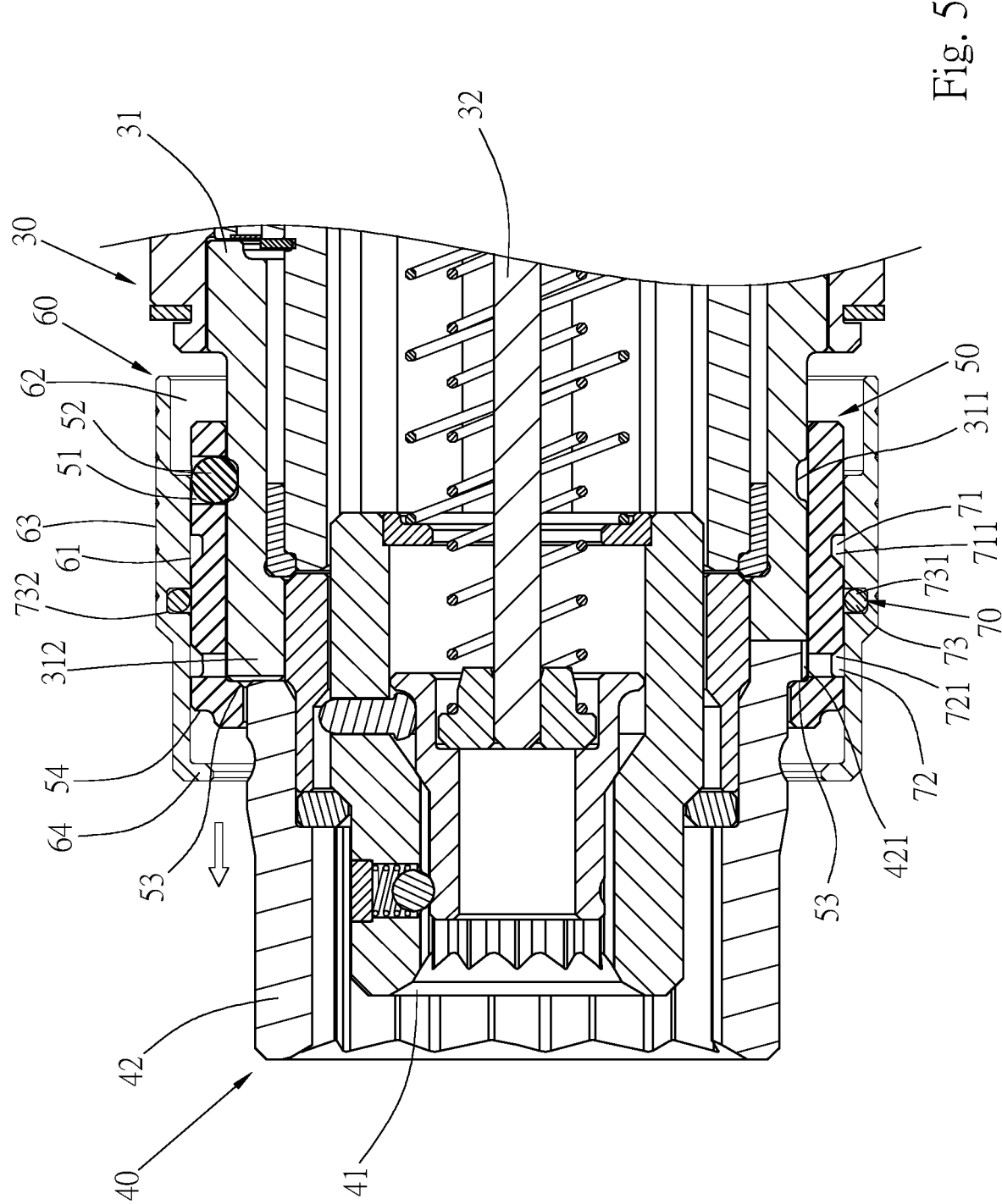
FIG. 5 is a cross-sectional view of a pushing state at the same position in FIG. 4.

Please refer to FIG. 5, when the chuck unit 40 needs to be changed to a different size, since the concave-convex portion 63 has an embossed surface to increase friction and facilitate holding and applying force, a user can hold the concave-convex portion 63 of the outer sleeve portion 60 to pull and apply force. When the outer sleeve portion 60 is pushed forward, the elastic fastener 731 of the guiding and positioning portion 73 will be moved from the ring groove 711 of the first positioning portion 71 to the ring groove 721 of the second positioning portion 72, at this time, a portion of the outer sleeve portion 60 located on the outer sides of the through holes 51 of the central sleeve portion 50 will be changed from the abutting portion 61 to the wide portion 62, so that the locking members 52 in the through holes 51 can protrude in the wide portion 62, and the locking members 52 will not be restricted by the ring groove 311 of the inner sleeve portion 31, so that the central sleeve portion 50 is capable of sliding on the inner sleeve portion 31. Then, the central sleeve portion 50 and the outer sleeve portion 60 can be pushed forward to separate the central sleeve portion 50 from the inner sleeve portion 31, the first assembly portion 312 can be detached from the second assembly portion 421, the chuck unit 40 can be detached from the body 30, and the chuck unit 40 of a different size can be replaced.

Figure 6:
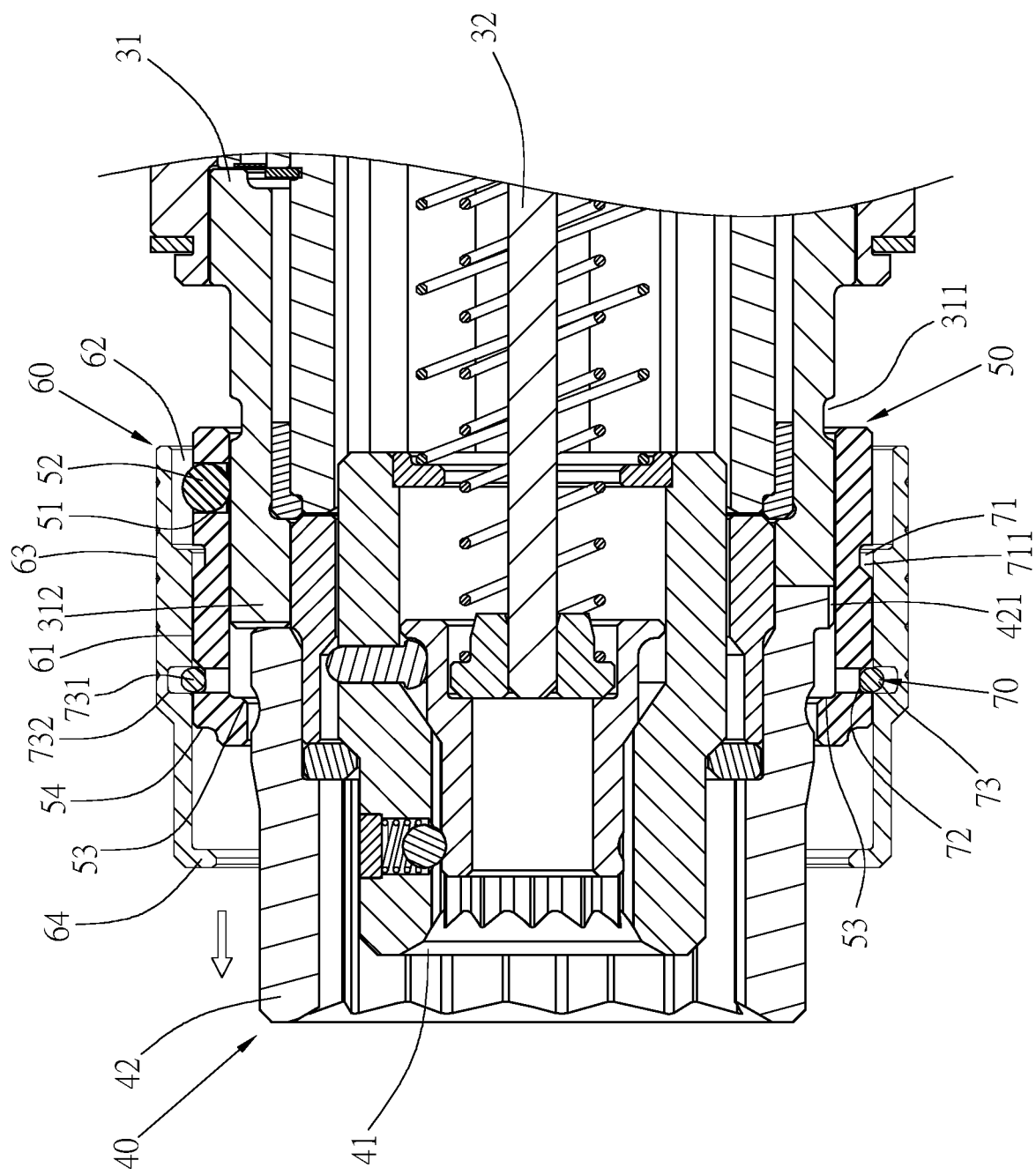
FIG. 6 is a cross-sectional view of an unlocked state at the same position in FIG. 4.
Figure 7:
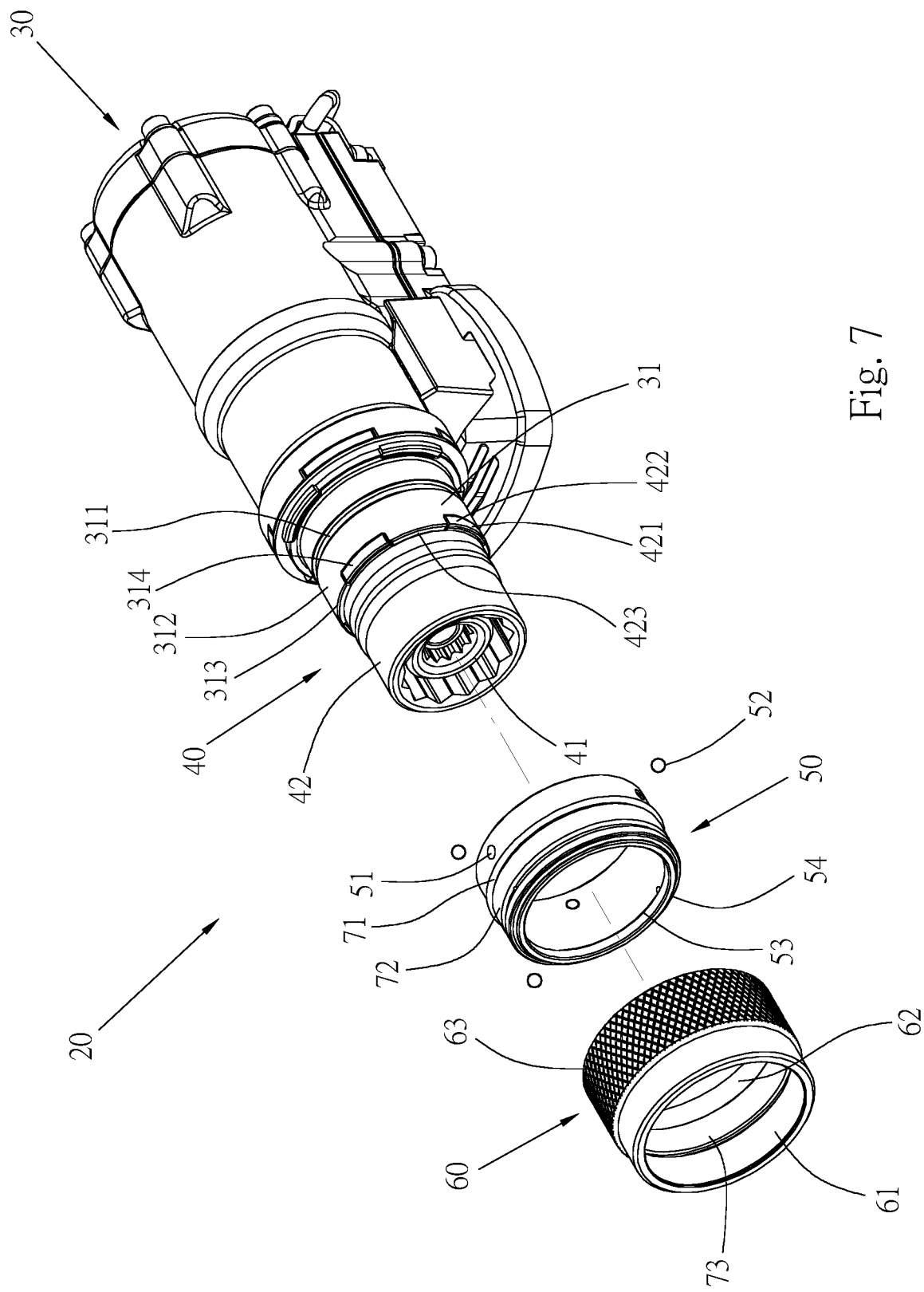
FIG. 7 is a perspective exploded view of assembly of an inner sleeve portion and a chuck unit according to a preferred embodiment of the invention.

Please refer to FIG. 7, when the chuck unit 40 is replaced, the second protrusions 422 and the second grooves 423 of the second assembly portion 421 are respectively aligned with the first grooves 314 and the first protrusions 313 of the first assembly portion 312, so that the second assembly portion 421 can be assembled on the first assembly portion 312. Then, please refer to FIGS. 6, 5 and 4 as well, the central sleeve portion 50 and the outer sleeve portion 60 are inserted from a front end of the chuck unit 40, the through holes 51 of the central sleeve portion 50 can be overlapped with the ring groove 311 of the inner sleeve portion 31, and the stop portion 53 on the front end of the central sleeve portion 50 wedges with the first assembly portion 312 and the second assembly portion 421. Then, the outer sleeve portion 60 is pushed toward the body 30, so that the abutting portion 61 can move to reach the outer sides of the through holes 51, the locking members 52 can be pushed to dispose between the through holes 51 of the central sleeve portion 50 and the ring groove 311 of the inner sleeve portion 31 to form a snap fit. Positions of the central sleeve portion 50 and the inner sleeve portion 31 will be fixed, and assembling of the chuck unit 40 is completed. And the elastic fastener 731 of the guiding and positioning portion 73 on the outer sleeve portion 60 will be positioned in the ring groove 711 of the first positioning portion 71, and the convex rib 64 will snap on the outer side of the step portion 54 to form a positioning.

In the structure for replacing shear wrench head provided by the invention, with positional changes of the outer sleeve portion, the central sleeve portion can be snap fitted on the inner sleeve portion, and the inner sleeve portion and the chuck unit are fixed with each other; compared with the conventional shear wrenches, replacement of the chuck requires a tool, and fixing is not easy either; while the structure for replacing shear wrench head of the invention is simple to operate, and can be replaced quickly, conveniently and promptly without using any tool.

The above-mentioned embodiments are merely used to illustrate the technical ideas and features of the invention, with an object to enable any person having ordinary skill in the art to understand the technical content of the invention and implement it accordingly, the embodiments are not intended to limit the claims of the invention, and all other equivalent changes and modifications completed based on the technical means disclosed in the invention should be included in the claims covered by the invention.

What is claimed is:

1. A structure for replacing a shear wrench head comprising:
    a body with an inner sleeve portion provided at a front end thereof, a ring groove being disposed around an outer circumference of the inner sleeve portion and a first assembly portion being disposed at a front end face of the inner sleeve portion;
    a chuck unit having an outer chuck, a rear end face of the outer chuck being provided with a second assembly portion, the second assembly portion being assembled with the first assembly portion;
    a central sleeve portion sleeved on the inner sleeve portion, at least one through hole penetrating through a wall surface of the central sleeve portion, a locking member being disposed in each of the through holes respectively, each of the locking members being partially exposed from each of the through holes, a stop portion protruding inwardly being provided on a front end face of the central sleeve portion, the stop portion being capable of retaining the first assembly portion and the second assembly portion; when the stop portion retaining the first assembly portion and the second assembly portion, a position of the through hole approximately overlapping with the ring groove of the inner sleeve portion, so that the locking member being disposed between the ring groove and the through hole; and
    an outer sleeve portion slidably disposed on an outer peripheral surface of the central sleeve portion, an inner wall surface of the outer sleeve portion being provided with an abutting portion on a front side and a wide portion on a rear side, and a diameter of the wide portion being larger than that of the abutting portion;
    wherein, when the outer sleeve portion is selectively moved to a locked position, the outer sleeve portion fixes the central sleeve portion with the body and fixes the chuck unit between the central sleeve portion and the body;
    wherein when the outer sleeve portion is axially moved to an unlocked position, each of the outer sleeve portion, the central sleeve portion, and the chuck unit can be separated from the body allowing the chuck unit to be exchanged with an alternate chuck unit, and the alternate chuck unit can be fixed with the body by the central sleeve portion and the outer sleeve portion.

2. The structure for replacing shear wrench head as claimed in claim 1, wherein a front end face of the outer sleeve portion is provided with a convex rib protruding inwardly, and the convex rib snaps on the front end face of the central sleeve portion.

3. The structure for replacing shear wrench head as claimed in claim 2, wherein an outer side of the front end face of the central sleeve portion is provided with a step portion corresponding to the convex rib, and the convex rib snaps on an outer side of the step portion.

4. The structure for replacing shear wrench head as claimed in claim 1, wherein a positioning unit is provided between the central sleeve portion and the outer sleeve portion, the positioning unit comprising a first positioning portion, a second positioning portion, and a guiding and positioning portion, the first positioning portion and the second positioning portion are disposed at an interval along an axial direction of the central sleeve portion; the guiding and positioning portion can be disposed on the first positioning portion or the second positioning portion with positional changes of the outer sleeve portion, when the guiding and positioning portion is located at the first positioning portion, the through holes of the central sleeve portion correspond to the abutting portion of the outer sleeve portion, when the guiding and positioning portion is located at the second positioning portion, the through holes of the central sleeve portion correspond to the wide portion of the outer sleeve portion.

5. The structure for replacing shear wrench head as claimed in claim 4, wherein the first positioning portion and the second positioning portion are respectively a ring groove, and the guiding and positioning portion is an elastic fastener.

6. The structure for replacing shear wrench head as claimed in claim 1, wherein the first assembly portion of the body comprises a plurality of first protrusions and a plurality of first grooves disposed at intervals, the second assembly portion of the outer chuck of the chuck unit comprises a plurality of second protrusions and a plurality of second grooves disposed at intervals, the first protrusions are accommodated in the second grooves, and the second protrusions are accommodated in the first grooves.

7. The structure for replacing shear wrench head as claimed in claim 6, wherein the second protrusions on the outer chuck of the chuck unit are protruded outwardly from the rear end face of the outer chuck in a radial direction, so that after the first grooves of the inner sleeve portion of the body are assembled with the second protrusions, the second protrusions are located at the front end face of the inner sleeve portion and can be retained by the stop portion of the central sleeve portion.

8. The structure for replacing shear wrench head as claimed in claim 1, wherein the outer sleeve portion is provided with a concave-convex portion.

9. The structure for replacing shear wrench head as claimed in claim 1, wherein each of the locking members is composed of a sphere, and a diameter of each of the spheres is greater than a depth of each of the through holes.

* * * * *